March 11, 1924.

R. R. REISSIG 1,486,607

TANK AND METHOD OF MAKING

Filed March 7, 1923

INVENTOR
RUDOLF R. REISSIG.
BY
ATTORNEY.

Patented Mar. 11, 1924.

1,486,607

UNITED STATES PATENT OFFICE.

RUDOLF R. REISSIG, OF ROOSEVELT, NEW YORK, ASSIGNOR, BY MESNE ASSIGNMENTS, TO CURTISS AEROPLANE AND MOTOR COMPANY, INC., OF GARDEN CITY, LONG ISLAND, NEW YORK, A CORPORATION OF NEW YORK.

TANK AND METHOD OF MAKING.

Application filed March 7, 1923. Serial No. 623,563.

*To all whom it may concern:*

Be it known that I, RUDOLF R. REISSIG, a citizen of the United States, residing at Roosevelt, in the county of Nassau and State of New York, have invented certain new and useful Improvements in Tanks and Methods of Making, of which the following is a specification.

My invention relates to containers and more particularly to metal tanks, i. e., gasolene, oil and other tanks used on or in connection with aeroplanes, automobile and other automotive vehicles.

Heretofore, gas tanks, and especially the gas tanks of aeroplanes, due to the volume of gas contained therein and to the constant shifting of the tank relatively to the horizontal, have been provided with one or a plurality of baffles. Such baffles not only reinforce the tank but they very appreciably reduce the bulk movement of the liquid as the position of the tank shifts. Ordinarily such baffles are riveted in place. Rivets, however, as a means for fastening the baffles, are objectionable. Leaks are likely to occur, due to vibration, and in the construction of the tank it is necessary that a portion of the work be carried on from the inside. Moreover, in the construction of aeroplane tanks, due to the large volume of gasolene required to be carried, and to the constant shifting of the confined liquid mass, rivets frequently work loose, the result being a loss of gas and an ever present possibility of fire.

To overcome the above objectionable features, attempts have been made to secure the baffles in place by welding. This method, if carried on in the ordinary or well known manner, is unsatisfactory because of the heat effect on the metal; the result being a warped tank with a metal shell very noticeably distorted. To avoid such distortion and to secure a strong and leakproof fastening for the baffles, is a particular object of this invention. Warping is eliminated by crimping or corrugating the metal tank along the line of attachment of the baffle, such intentional deformation of the tank resulting in a localization of the heat during the welding operation. The edges of the baffle are let through openings in the metal shell and the projecting portions welded upon the tank exterior. In this way an inter-lock is provided, the welded joint effectually sealing the opening or openings through which the projecting portion or portions of the baffle extend. Furthermore, during the welding process, all work is carried on from the outside.

A tank characterized as last above set forth is durable, light and strong. Such a tank is especially adapted to the aeroplane. It can be manufactured economically, and through the use of a number of baffles, it (the tank) can be made as large as desired without deforming the shell in the making or straining the shell due to the mass movement of its contents.

Other objects and advantages of the invention will be hereinafter more fully explained.

In the drawings, wherein, like reference characters denote like or corresponding parts.

Figure 1:
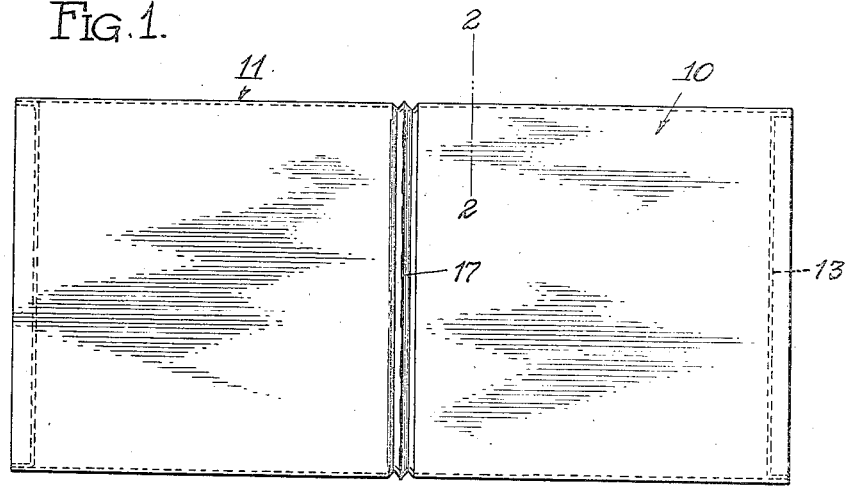
Fig. 1 is a side elevation of a metal tank provided with a single baffle fastened in place by welding as herein disclosed.
Figure 2:
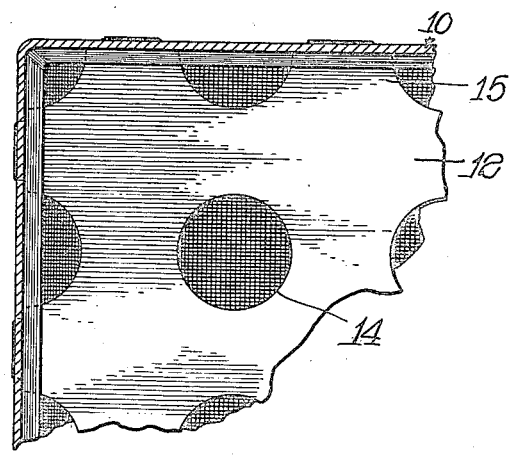
Fig. 2 is an enlarged transverse sectional view taken on the line 2—2 of Fig. 1.
Figure 3:
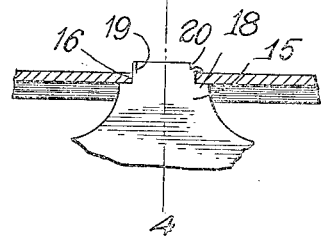
Fig. 3 is a fragmentary sectional view showing the tongue formation before welding.
Figure 4:
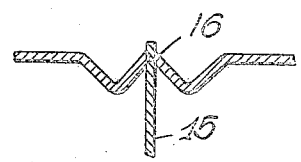
Fig. 4 is a section on the line 4—4 of Fig. 3.
Figure 5:
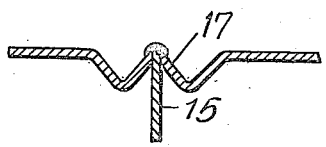
Fig. 5 is a view similar to Fig. 4 showing the connection as it appears when welded.

In the embodiment of the invention selected for illustration, 10 designates a gas tank preferably constructed of aluminum. Such tank comprises an outer shell 11, an intermediate baffle 12 and end pieces 13, the latter being fastened on the inside of the shell in any suitable manner. The baffle 12 is provided with a plurality of openings 14 to permit of the transfer of the liquid contents of the tank from one to the other side of the baffle. It is further provided with a plurality of tongues or projecting portions 15, each of which is adapted to engage in an opening 16 formed in the metal shell. The metal shell 11, immediately of its ends, is crimped as indicated at 17 to provide a double corrugation, the openings or aperture 16 being formed in line with such crimped portion at the apex of the outwardly directed channel formed by the double corrugation.

In the construction of the tank the baffle is first cut, stamped or otherwise fashioned as desired. The shell 11 is then wrapped around the baffle so as to cause the tongues 15 thereof to enter the openings 16 formed in the double corrugation. Shoulders 18 formed on the tongues 15 bear against the inner wall of the shell to prevent the tongues from entering into the openings beyond the desired distance. With the tongues 15 thus projected through the openings 16, the projected portion of each tongue is welded to the outer surface of the shell, such weld providing in effect an inter-lock between the baffle and the shell and at the same time effectually sealing the several openings. As an aid in effecting a proper weld the tongues 15 are split, as indicated at 19, whereby the edges thereof may be turned or peaned over as indicated at 20 upon the outer face of the shell at the ends of the slots or openings 16.

In providing a double corrugation along the line of weld the heat, during a welding operation, is localized and the metal shell prevented from warping. By extending the tongues through the outwardly directed apex of the double corrugation such tongues are rendered more accessible and the welding operation accordingly simplified. In attempting to weld without the double corrugation, it has been found that the effect of the heat in welding upon the metal shell is such that the tank is warped and twisted to such an extent as to ofttimes render it unfit for use. It has been further found that by crimping or corrugating the shell, as herein illustrated, the heat effect is localized and all distortion or deformation eliminated.

From the above it is obvious that an exceptionally strong fastening for the baffle is obtained through the use of the methods herein outlined. It is further obvious that the entire welding process is carried on from the outside of the tank and that the fusion of the metal occurs on the opposite side of the shell from that against which the shoulders 18 of the tongues abut. Such a connection or fastening gives maximum strength and at the same time renders the connection absolutely leak-proof.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. A tank comprising an outer shell provided with an opening, a corrugation formed in the outer shell, said opening being formed within said corrugation, a part extended off from said outer shell at an angle, said part being provided with a projecting portion which engages in said opening, and a fastening for said part formed by welding such projecting portion and said outer shell together.

2. A tank comprising an outer shell provided with a plurality of openings, a corrugation formed in the outer shell, said openings being formed within said corrugation, a baffle extended off from said outer shell at an angle, tongues formed upon said baffle for fitting engagement in said openings, and a fastening for said baffle formed by welding the tongues to said outer shell, the nature of the weld being such that for each opening a closure is provided.

3. A tank comprising an outer shell provided with a plurality of slotted openings, a double corrugation formed in said outer shell, said double corrugation being so related to said slotted openings that a single corrugation is disposed on either side thereof, a baffle extended off from said outer shell at an angle and having its marginal portions engaging in the outwardly directed channel formed by said double corrugation, tongues formed upon said baffle for fitting engagement in said slotted openings, and a fastening for said baffle formed by welding the tongues to said outer shell, the nature of the weld being such that for each slot a closure is provided.

4. A method of fastening baffles in tanks which consists in extending portions of said baffle through openings in the tank wall and fusing such extended portions until a welded joint between the baffle and the tank and closures for said openings are provided.

5. A method of fastening baffles in tanks which consists in corrugating the tank and puncturing the wall of the corrugation, in letting portions of the baffle extend through the openings in the corrugation, and in fusing such extended portions until a welded joint between the baffle and closures for said openings are provided.

6. The method of fastening baffles in tanks which consists in corrugating the tank and puncturing the wall of said corrugation at spaced intervals along its apex, in letting portions of the baffle extend through the openings in the corrugation, and in fusing such extended portions until a welded joint between the baffle and the tank and closures for said openings are provided upon the exterior of the tank and at the apex of said corrugation.

7. The method of fastening baffles in tanks which consists, first in corrugating the wall of the tank to the end that two parallel juxtaposed corrugations are provided, next in puncturing said tank along the outwardly directed apex of the wall of said double corrugation, next in extending portions of the baffle into the outwardly directed channel formed by said double corrugation as well as through said openings, and finally in fusing the extended portions until a welded joint between the baffle and the tank and closures for said openings are provided.

In testimony whereof I hereunto affix my signature.

RUDOLF R. REISSIG.